May 23, 1961 J. F. SCHOUWEILER 2,985,820
TESTING CIRCUITS
Filed Jan. 13, 1959 5 Sheets-Sheet 1

FIG. 1

INVENTOR
J.F. SCHOUWEILER
BY A.C. Schwarz, Jr.
ATTORNEY

United States Patent Office 2,985,820
Patented May 23, 1961

2,985,820
TESTING CIRCUITS
James F. Schouweiler, Naperville, Ill., assignor to Western Electric Company, Incorporated, New York, N.Y., a corporation of New York
Filed Jan. 13, 1959, Ser. No. 786,556
9 Claims. (Cl. 324—26)

This invention relates to testing circuits and more particularly to circuits for testing transmitting tubes of the magnetron type.

One of the methods used in the past to test transmitting tubes has been to apply the proper voltages to the tube until failure in a so called "life" test. One of the disadvantages of such a test is that the tube is not operated under conditions simulating the conditions met in actual field operation. With this problem in mind, one of the objects of this invention is to provide a system for testing a transmitting tube under conditions simulating those met in actual service.

Another object of this invention is to provide a circuit for testing transmitting tubes in cycles including operating and non-operating periods.

Still another object of this invention is to provide a testing circuit which automatically and continually tests a transmitting tube and which renders itself inoperative if the tube or some portion of the circuit fails during the test.

A further object of this invention is to provide a circuit for testing a transmitting tube and for rendering itself inoperative if a predetermined number of faults or out-of-limits conditions of a predetermined duration occur in the circuit or the tube being tested within a predetermined time interval.

One embodiment of the invention may include a power supply for charging a pulse forming network connected through a pulse transformer to a transmitting tube to be tested. A tube in a discharge network is intermittently fired to cause the tube under test to intermittently oscillate. A voltage control system in an administrative system operates the power supply to intermittently apply power to operate the tube under conditions encountered in actual service. The administrative system operates the voltage control system to disconnect the power supply and render the testing circuit inoperative if a predetermined number of faults or out-of-limits conditions occur in the tube under test or in the testing circuit within a predetermined time interval. Faults in the tube will be reflected and indicated by changes in voltages at various points in the circuit.

Other objects and advantages will be apparent from the following detailed description when considered in conjunction with the accompanying drawings, wherein.

*Block diagram*

Figure 1:
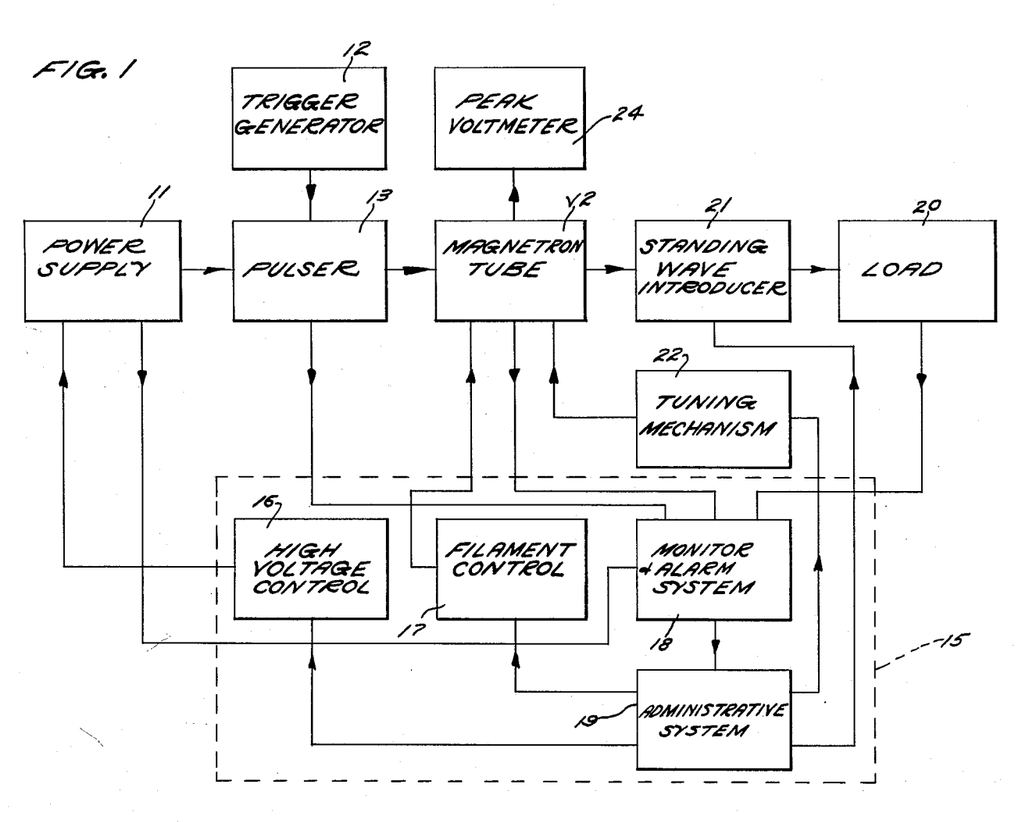
Fig. 1 is a block diagram of a testing system embodying the present invention.

Referring now to the drawings, attention is first directed to the block diagram of Fig. 1 wherein a general layout of the testing circuit is shown for illustrative purposes. A power supply 11 and a trigger generator 12 cooperate to operate a pulser 13, which controls a magnetron tube V2 under test so as to cause the magnetron tube to oscillate. A control system 15 includes a high voltage control 16, a filament control 17, a monitor and alarm system 18, and an "administrative" system 19. The "administrative" system 19 serves to accomplish the various switching operations to properly connect together the desired circuit components as the testing operation is carried out. The administrative system also controls the high voltage and filament controls. The monitor and alarm system 18 operates the administrative system 19 to disable the test circuit in the event that certain failures or out-of-limits conditions occur in the tube V2 or the testing circuit.

The administrative system 19 actuates the high voltage control 16 so as to render the power supply 11 inoperative in intermittent intervals to simulate "on" and "off" periods such as are encountered in actual service. A peak voltmeter 24 measures the voltage applied to the magnetron tube.

The filament control 17 determines the filament voltage applied to the tube V2 and varies this voltage from one value to another at intervals during the testing cycle.

The tube V2 is connected to an artificial load 20 of a well known type including wave guides and radio frequency plumbing (not shown) of a conventional type. In order to vary the phase relationship of the tube V2 and its load 20, a standing wave introducer 21 of a well known type is connected between the tube V2 and the load 20. The standing wave introducer is driven by a motor in a well known manner.

The testing cycle is 60 minutes in duration and is automatically repeated until the tube V2 or the circuit fails a predetermined number of times within a predetermined time interval. During the first 20 minutes of the cycle the tube V2 is first disconnected from power for a period and is then connected to a filament voltage which is normally stepped downward from one value to a normal operating value, this stepping being effected by the filament control 17. During the last 40 minutes of the cycle the tube V2 is operated continuously, the standing wave introducer 21 and a tuning mechanism 22 also being operated continuously to vary the phase relationship of the load and the tuning of the tube V2. The tuning mechanism 22, a well known type, varies the operating frequency of the tube V2 within its frequency range.

Figure 3:
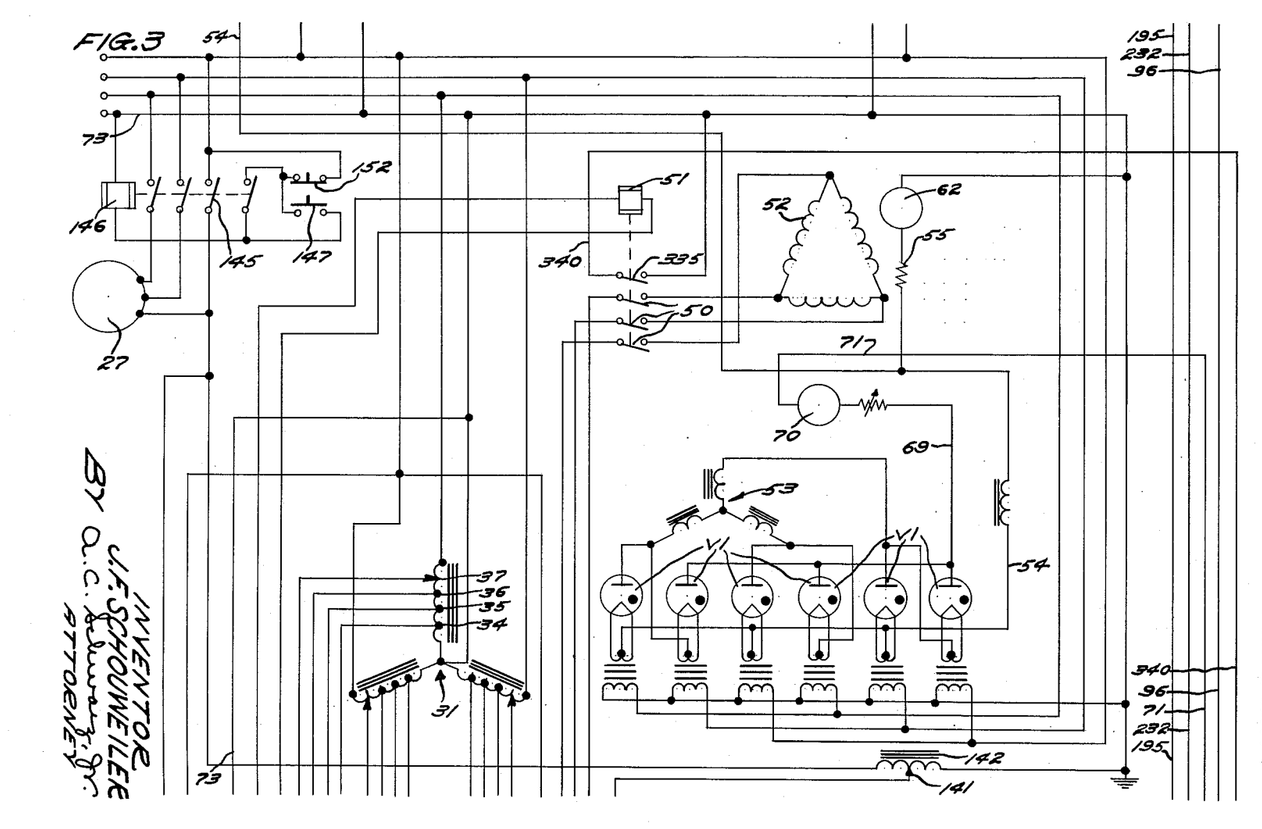

To prevent arcing, the radio frequency plumbing is maintained under a constant air pressure, thereby causing air to flow through this plumbing. A blower (not shown) is driven by a motor 27 (Fig. 3) to supply the air pressure. This is a well known expedient.

*Power supply and voltage control*

In Figs. 2, 3, 4 and 5, a schematic diagram of the circuit is shown. Three phase power is applied from a desirable source to a high voltage variac 31 (Fig. 3) having "low," "intermediate," "high," and "operate" voltage taps 34, 35, 36 and 37, respectively. These taps 34, 35, 36 and 37 are connected through contactors 40, 41, and 42 (Fig. 4) of relays 46, 47, and 48, respectively, and also through contactors 50 (Fig. 3) of a relay 51 to a primary winding 52 of a three phase delta-Y rectifier of a well-known type which has a secondary winding 53. The taps 34, 35, 36 and 37 are connected to the relay contactors 40, 41 and 42 in such a way that when none of the relays 46, 47 or 48 are energized, the "low" voltage taps 34 are connected to the primary winding to supply a low voltage; when the relay 46 is actuated, the "intermediate" voltage taps 35 are connected to the primary winding 52 to supply an intermediate voltage; when the relay 47 is actuated, the "high" voltage taps 36 are connected to the primary winding to supply a high voltage; and, when the relay 48 is energized, the operate voltage taps 37 are connected to the primary winding 52 to supply an operating voltage determined by the settings of the contactors 37.

The output power from the secondary winding is rectified by tubes V1 and supplied through a conductor 54 and a charging choke 60 (Fig. 2) to a pulse forming network 61 for charging it. Thus, it can be seen that, as the relays 46, 47 and 48 are sequentially energized— each relay being deenergized as the following relay is energized with the relay 48 remaining energized the voltage applied to the magnetron tube V2 will be stepped up in increments from a minimum value to a desired operating value.

A grounded ammeter 62 connected to the conductor 54 through a resistor 55 is provided for measuring the output voltage of the power supply 11. The meter 62 is calibrated to indicate the output voltage of the power supply.

A conductor 69 connected to plates of three of the rectifying tubes V1, passes the power supply output current through an ammeter 70, a conductor 71 and a rheostat 72 (Fig. 5) to ground or neutral 73, the power supply output current also being supplied to the pulse forming network 61. The ammeter 70 thus indicates the value of the current applied to fire the magnetron tube V2. The rheostat 72 is set to cause a relay 80 to be energized to close contactors 81 and 82 if the output current of the power supply 11 exceeds a predetermined desirable value.

The pulse forming network 61 (Fig. 2) is connected through a primary winding 90 of a pulse transformer 91 to the plate of the magnetron tube V2 to be tested.

Filament control

A filament transformer 92 (Fig. 2) supplies a filament current to the magnetron tube V2 through secondary windings 93 of the pulse transformer 91. The primary winding of the filament transformer 92 is connected through a conductor 96 (Fig. 3) to one side of a rheostat 97 (Fig. 5) connected in parallel with a relay 101 having contactors 102 and 103 normally engaging contacts 106 and 107, respectively.

The other side of the rheostat 97 is connected to a contact 110 (Fig. 4) of a "preheat" relay 111 and to a contactor 112 of a relay 113. The contactor 112 normally engages a contact 116 connected to a tap 117 of a first filament variac 118. The contactor 112 is movable to engage a contact 122 connected to a tap 123 of a second filament variac 124. The filament variacs 118 and 124 are connected in parallel between neutral 73 and a contact 128 of the preheat relay 111, which has a contactor 129 normally engaging the contact 128.

The contactor 129 is connected to a contact 134 of a "filament" relay 135 having a contactor 136. The contactor 136 is connected through a conductor 140 to a tap 141 (Fig. 3) of a filament variac 142 which is connected to power through a contactor 145 of a relay 146, the relay 146 being energized when a "start" switch 147 is closed. When the switch 147 is closed, the relay 146 locks itself in through a "stop" switch 152.

When the filament relay 135 (Fig. 4) is energized and the preheat relay 111 is not energized the filament variacs 118 and 124 are connected through contacts 128 and 134 and the conductor 140 to the tap 141 of the filament variac 142. When both the relays 135 and 111 are energized the filament variacs 118 and 124 are disconnected from the circuit and the primary winding of the filament transformer 92 is connected directly to the tap 141 of the filament variac 142 through the conductor 96, the filament rheostat 97, the contact 110 and the contactor 129 of the relay 111, the contact 134 and the contactor 136 of the relay 135, and the conductor 140. In this manner the input voltage of the filament transformer 92 can be taken from one of the taps of the filament variacs 118 or 124 or the tap 141 of the filament variac 142.

An ammeter 150 (Fig. 2) is provided for measuring the filament current, and a voltmeter 151 is provided for measuring the filament voltage. Capacitors 154 and 155 are connected between the secondary windings 93 of the pulse transformer 91 as shown for shunting the voltmeter 151 to prevent the magnetron tube V2 input pulses from damaging the voltmeter.

Pulser

The pulse forming network 61 is discharged to ground or neutral 73 through a hydrogen thyratron tube V3 (Fig. 2) which is fired by the trigger generator 12 of a well-known type connected to the power supply. An inductance-resistance network 162 is provided for shaping the trigger pulse. The discharge current flowing in the primary winding 90 of the pulse transformer 91 energizes the secondary windings 93 of the pulse transformer to fire the magnetron tube V2 which is being tested.

A resistance-capacitance network 165 (Fig. 2) connected between the tube V3 and ground 73 limits the discharge current of the network 61, and a series parallel resistance-capacitance-inductance network 166 connected to the plate of the hydrogen thyratron tube V3 serves as a pulse shaper to prevent an excessive rate of rise of the voltage applied to the magnetron tube V2 under test.

Figure 2:
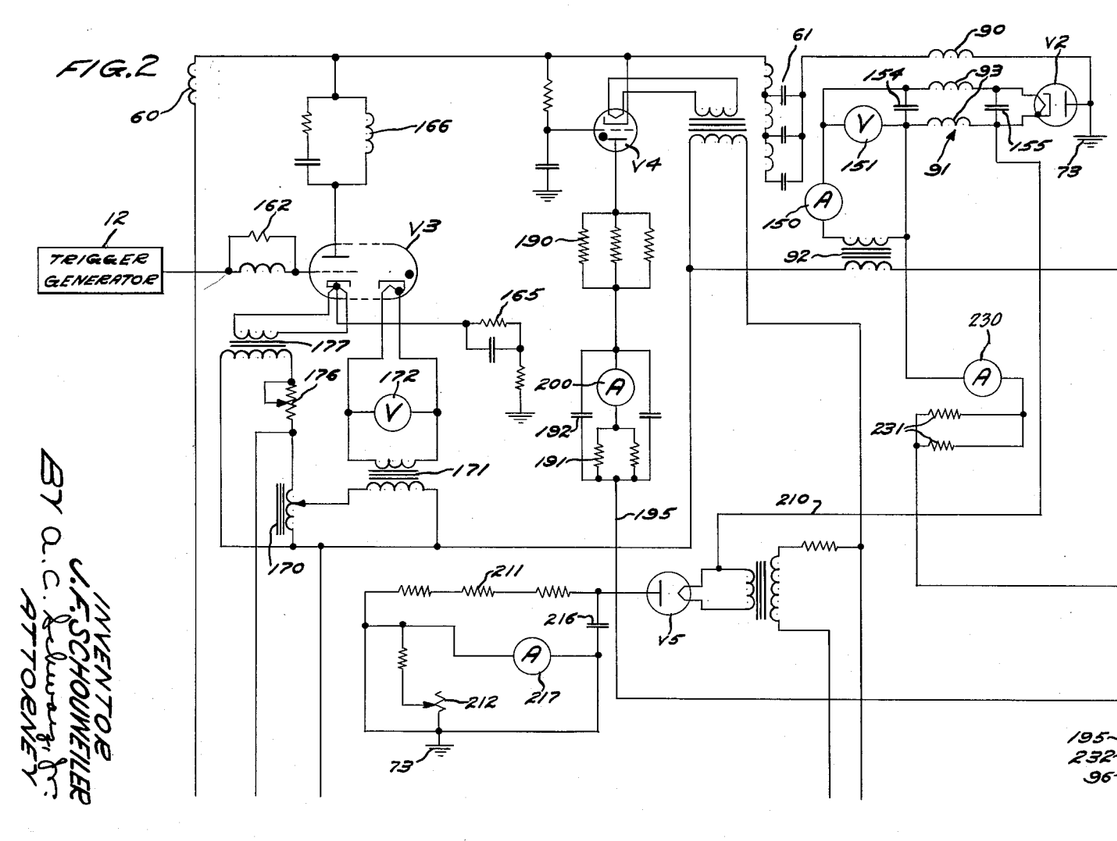
Figs. 2, 3, 4, and 5 are schematic drawings of the testing circuit showing in detail the relationships of the various components making up the circuit.

A rheostat 170 and a transformer 171 supply an adjustable voltage to the capsule of the hydrogen thyratron tube V3. This voltage is measured by a voltmeter 172. Another rheostat 176 and another transformer 177 apply an adjustable voltage to the heater of the tube V3.

A stage is provided in the pulser 13 for clipping the negative tails off pulses reflected from the pulse forming network 61 during firing of the magnetron tube V2. This clipping stage consists of a hydrogen thyratron tube V4 connected in series with resistances 190, parallel connected resistances 191 and capacitances 192, a conductor 195, and a rheostat 196 (Fig. 5) connected in parallel with a relay 197. The rheostat 196 can be set so as to cause the energization of the relay 197 to close contactors 198 and 199 if the reverse diode current flow through the tube V4 becomes excessive. An ammeter 200 (Fig. 2) is provided for indicating the value of the reverse diode current.

Peak voltmeter

The peak voltmeter 24 is provided for measuring the input voltage of the magnetron tube V2. The cathode of the magnetron tube V2 is connected to the cathode of a tube V5 (Fig. 2) by a conductor 210 whereby the input voltage of the magnetron tube V2 is applied to the cathode of the tube V5. The anode of the tube V5 is connected to ground 73 through series connected leakage resistance 211 and a variable resistance 212 which are connected in parallel with a capacitance 216. When the magnetron tube V2 is fired, the capacitance 216 is charged through the tube V5 to a voltage approximately equal to the input voltage of the magnetron V2, which charge leaks off to ground 73 through the leakage and variable resistances 211 and 212.

A meter 217 connected across the variable resistance 212 is provided for measuring a portion of the leakage current to determine the voltage across the capacitance 216, which voltage is the magnetron tube V2 input voltage. In this manner the magnetron tube V2 input voltage is measured. The variable resistance 212 can be adjusted to calibrate the meter 217.

Anode control

The anode current of the magnetron tube V2 flows through a series circuit comprising the secondary windings 93 of the pulse transformer 91, an ammeter 230, resistances 231, a conductor 232, and a rheostat 236 (Fig. 5) connected in parallel with a relay 237. The rheostat 236 is set to cause the energization of the relay 237 if the magnetron tube V2 anode current becomes excessive, the relay 237 being provided with contactors 238 and 239. The ammeter 230 indicates the value of this anode current.

Control system

The control system 15 is provided with five timers (Fig. 5) 250, 260, 265, 270, and 280 of well known types which automatically control the cycling of the entire testing circuit in cycles one hour in length. The timer 250, a sixty minute timer, is provided with contactors 251, 253, 252, 254, 255, and 256. The numbers shown beneath each contactor represent the closing and opening times of that contactor in the sixty minute cycle. For example, the numbers 10—60 beneath the contactor 251 indicate that this contactor closes ten minutes after the cycle begins and opens sixty minutes after the cycle begins (which is the end of the cycle).

Figure 5:
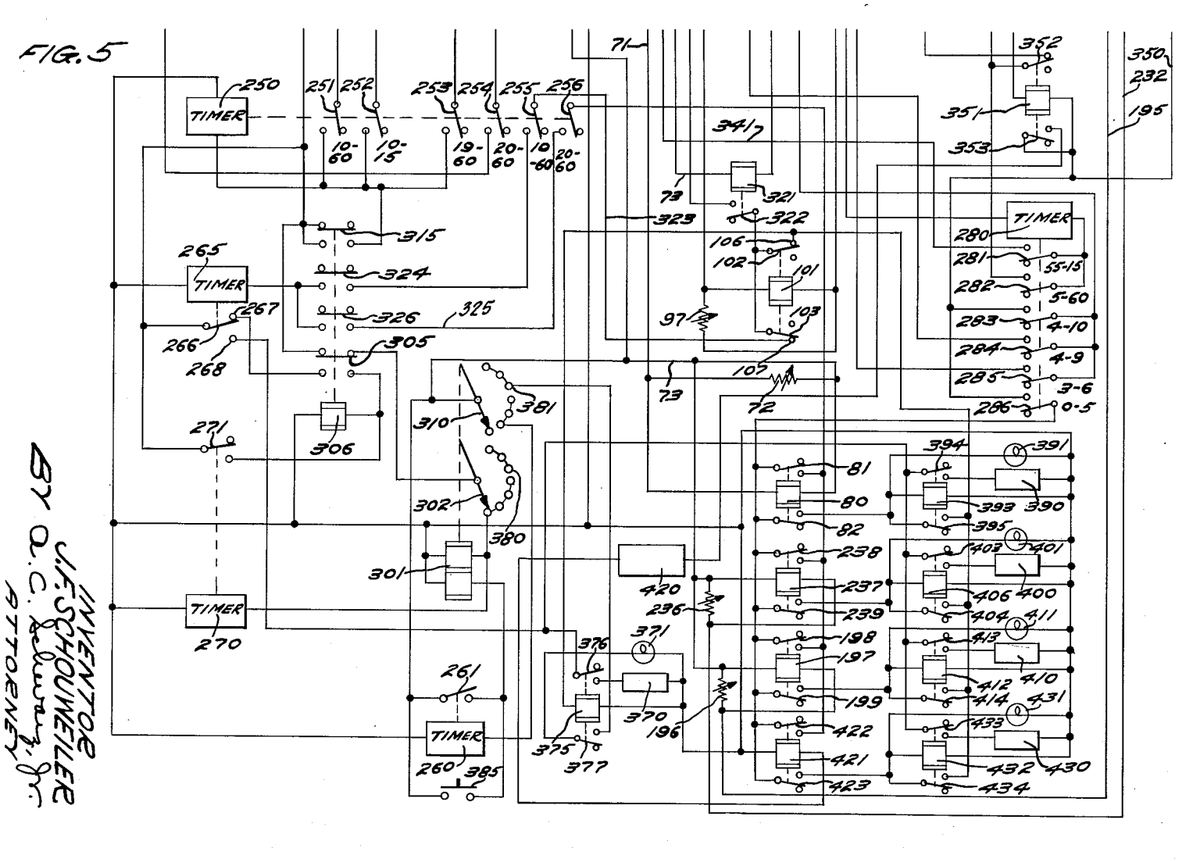

The timer 260 is a "five minute" timer, a contactor 261 being closed by the timer 260 five minutes after it is energized. The timer 265 is a "fifteen second" timer, since it moves a contactor 266 from a contact 267 to a contact 268 fifteen seconds after it is energized. The timer 270, a "fifteen second" timer, closes a contactor 271 fifteen seconds after being energized.

The timer 280 controls the operation of the relays 46, 47 and 48 in the power supply and operates on a sixty second cycle. This timer is provided with contactors 281, 282, 283, 284, 285 and 286. The numbers shown adjacent to each contactor represent the closing and opening of that contactor in the sixty second cycle. For example, the numbers 55—15 adjacent to the contactor 281 indicate that this contactor is closed from a time five seconds prior to the beginning of the sixty second cycle to a time fifteen seconds after the beginning of this cycle.

Figure 4:
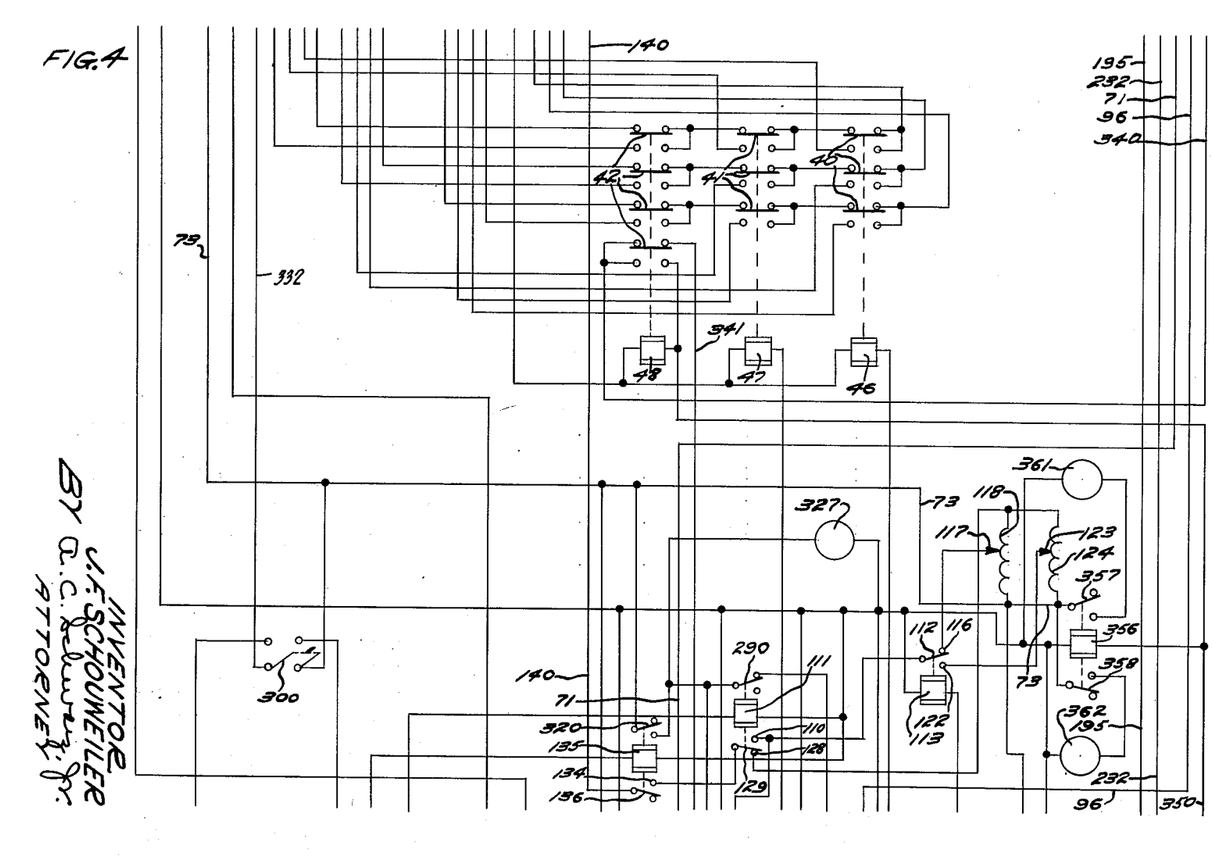

A switch 300, shown in Fig. 4, is closed to cause the system to operate automatically. The closing of switch 300 applies power to an operating coil of a stepping relay 301 and to the fifteen second timer 270 through a contactor 302 of this relay and a contactor 305 of a relay 306 which is not energized at this time. This causes the relay 301 to step one position. When the relay 301 steps one position, a second contactor 310 of the stepping relay 301 completes a circuit to apply power to the five minute timer 261.

At the end of 15 seeconds, the timer 270 closes its contactor 271 to energize the relay 306, the relay 306 moving the contactor 305 to deenergize the stepping relay 301 and disconnecting the timer 270 from power. The relay 306 locks itself in through its contact 305, the contact 267, and the contactor 266 of the fifteen second timer 265. The energization of the relay 306 also applies power to the 60 minute timer 250 through another contactor 315 of the relay 306. At the end of five minutes the timer 260 closes the contactor 261 to apply power to a reset coil of the stepping relay 301, causing the contactors 302 and 310 to be returned to their original positions. Movement of the contactor 310 breaks the circuit to disconnect the five minute timer 260 from power.

At the end of ten minutes, the timer 250 closes its contactors 251, 251 and 255. The closing of the contactor 251 energizes the "filament" relay 135, while the closing of the contactor 252 energizes the "preheat" relay 111. This connects the tap 141 (Fig. 3) of the filament variac 142 directly to the filament transformer 92 (Fig. 2) through the conductor 140, the contactor 136, the contactor 129, the filament rheostat 97 and the conductor 96. This energizes the relay 101 to open its contactors 102 and 103. Energization of the filament relay 135 also closes a contactor 320 to complete a circuit for energizing a relay 321 (Fig. 5) which closes a contactor 322. Thus, the relays 101 and 321 are energized simultaneously, the contactor 322 grounding the contactors 102 and 103, the closing of the contactor 256 connects a conductor 323 to the fifteen second timer 265 through a contactor 324 of the relay 306 so as to cause the operation of the timer 265 in the event that the filament current should become so low as to permit the relay 101 to drop out. A timer 327 is energized when the contactor 320 is closed to indicate the total time that the relay 135 is energized, thereby indicating the total time that the tap 141 of the filament variac 142 is connected to the filament transformer 92.

At the end of fifteen minutes from the starting time, the timer 250 opens the contactor 252 to drop out the "preheat" relay 111. This connects the filament transformer 92 to the tap 123 of the variac 124 through the contactor 112 of the relay 113 which was energized when the testing circuit was connected to power, the filament rheostat 97 and the conductor 96. The tap 141 of the filament variac 142 is connected now to the filament variacs 118 and 124. The voltage connected to the filament transformer 92 will thus be lowered when the preheat relay 111 drops out.

At the end of 19 minutes from start time, the timer 250 closes contactor 253 to connect one side of the relay 51 to neutral 73 through a conductor 332, the contactor 315 of the energized relay 306 and the switch 300. The relay 51 will not be energized until the other side thereof is connected to power.

At the end of twenty minutes from start time, the timer 250 closes its contactors 254 and 256. The closing of the contactor 255 applies power to the relay 51 (Fig. 3) which closes a contactor 335 and the contactors 50. The closing of the contactors 50 connect the primary winding 52 to the taps 34 of the high voltage variac 31, and the closing of the contactor 335 completes a circuit through a conductor 340, one of the contactors 42 of the relay 48, a conductor 341, and the contactor 281 of the sixty second timer 280 to start this timer in its cycle. The closing of the contactor 256 connects a conductor 325 through a contactor 326 of the relay 306 to the timer 265 to start this timer in the event that a fault causes the grounding of the conductor 325.

The sixty second timer controls the relays 46, 47 and 48 to step up the voltage applied to the primary winding 52, and consequently, the anode voltage applied to the magnetron tube under test. The timer 280 closes its contactor 285 after five seconds, thereby connecting the primary winding 52 to the taps 35 of the high voltage variac 31. One second later the timer 280 closes the contactor 284 to energize the relay 47 through a contactor 290 of the preheat relay 11 to connect the taps 36 to the primary winding 52 when the contactor 285 opens two seconds later and deenergizes the relay 47.

The timer 280 also closes the contactor 283 as the contactor 284 is closed, immediately energizing the relay 48 so as to connect the taps 37 to the primary winding 52 when the contactor 284 opens five seconds later and deenergizes the relay 47. The relay 48 locks itself in through one of its own contactors 42. Thus, the voltage applied to the primary winding 52 is increased in steps as the contactors 285 and 284 of the sixty second timer 280 are opened at six and nine seconds, respectively, after the timer 280 is energized. The contactor 283 is opened ten seconds after the timer 280 is deenergized, but the relay 48 remains locked in through its own contactor 42.

When the relay 48 is energized as above-described, it connects a conductor 350 to neutral 73 through the conductor 340, thereby energizing a relay 351 (Fig. 5) which opens a contactor 352 and closes a contactor 353. The opening of the contactor 352 deenergizes the relay 113 thereby connecting the filament rheostat 97 and the filament transformer 92 to the tap 117 through the contact 116. The tap 117 is normally set at a lower potential than is the tap 123.

From the foregoing description, it can be seen that the voltage applied to the filament transformer 92 is stepped downward from a high value to a lower operating value. Originally, the filament and preheat relays 135 and 111 are both energized to apply the "operate" voltage to the transformer 92 directly from the variac 142. The relay 111 is then dropped out as above-described to connect the transformer 92 to the tap 123. Then the relay 113 is dropped out to connect the transformer 92 to the tap 117, this tap supplying the operating filament potential.

The connection of the conductor 350 to neutral 73 as described above also energized a relay 356 (Fig. 4) which closed contactors 357 and 358 to apply power to motors 361 and 362. The motor 361 operates the tuning mechanism 22 (Fig. 1) of the magnetron tube V2 to cycle this tube through its frequency range as it is operated. The motor 362 operates the standing wave introducer or phase shifting device 21 (Fig. 1) which varies the load placed on the magnetron tube in a well known manner.

The magnetron tube V2 is at this stage operating under the proper voltages, the motors 361 and 362 (Fig. 4) varying the tuning of the magnetron tube V2 and the load placed on this tube. This operation continues for forty minutes, i.e., the period extending from twenty to sixty minutes after the switch 300 is closed to start the testing cycle.

At the end of sixty minutes from start time, the sixty minute timer 250 opens the contactors 251, 253, 254, 255, and 256 to end the sixty minute cycle. The opening of the contactor 251 deenergizes the filament relay 135, thereby opening the contactor 136 and disconnecting the filament variac 141 from the filament transformer 92 and also deenergizing the relay 321. The opening of the contactor 253 deenergizes the relay 51, which opens the contactors 50 to disconnect the primary winding 52 from the high voltage variac 31. The relay 51 also opens the contactor 335 to deenergize the relay 48 and the relay 351. Deenergization of the relay 351 closes the contactor 352 to energize the relay 113, thereby moving the contactor 112 into engagement with the contact 122 to set up this part of the circuit for the next cycle. The relay 306 remains locked in through the contactor 305.

The cycle is then repeated as described above except that the stepping relay 301 is not energized, since the relay 306 remained energized to prevent the contact 305 from completing the circuit for energizing the relay 301. Also, the timer 270 is not energized since the relay 301 does not step. The stepping relay 301 is thus energized only when the first sixty minute cycle begins, or when a fault of a predetermined duration occurs in the testing circuit. The fifteen second timer 270 is not connected to power unless the relay 301 is stepped.

*Monitor and alarm system*

The control system 15 includes a plurality of stages for indicating and counting faults in the circuit and the magnetron tube V2 under test. If a predetermined number of faults or out-of-limits conditions of a predetermined duration occur within a predetermined number of minutes, the circuit is rendered inoperative. In the embodiment disclosed, the occurrence of four or more faults each of at least fifteen seconds duration, within a period of five minutes renders the circuit inoperative and stops the test.

A first stage, associated with the filament voltage, includes a counter 370 (Fig. 5) of a well known type, a lamp 371, and a relay 375 having contactors 376 and 377. In the event that, for some reason, the filament voltage should drop below a desirable minimum limit, the relay 101 drops out to close contactors 102 and 103. This completes a circuit through the contactor 324 of the relay 306, the contactor 255 of the sixty minute timer, the contactors 103 and 102 and the contactor 322 to start the fifteen second timer 265.

If the filament voltage remains at this low value for 15 seconds, the timer 265 moves its contactor 266 to engage the contact 268, thereby deenergizing the relay 306 and grounding the counter 370 through the contactors 376 and 266. The counter then indicates that one fault or out-of-limits condition has occurred in the filament voltage supply. The deenergization of the relay 306 applies power to the relay 301 and the second fifteen second timer 270 through the contactors 266, 305, and 302 to step the relay 301. When the relay 301 steps, the five minute timer 260 is energized through the contactor 310.

At the end of another fifteen seconds, the second fifteen second timer 270 closes its contactor 271 to energize the relay 306 to open the circuit to the stepping relay 301 and the timer 270. If the fault still exists in the filament voltage supply, the timer 265 is again energized and the above procedure is repeated, this being indicated by the counter 370 as a second fault.

If no more than three faults occur within five minutes, the five minute timer 260 closes its contactor 261 to reset the stepping relay 301 to its starting position.

If, however, more than three faults occur, the contactors 302 and 310 of the relay 301, which is stepped once on each fault, reach contacts 380 and 381 respectively before the timer 260 closes its contactor 261 to reset the relay 301. When the contactor 310 reaches the contact 381, it opens the circuit to the five minute timer 260 thereby preventing a closing of the contactor 261 and the resetting of the stepping relay 301. The movement of the contactor 302 to the contact 380 also opens the circuit to the timer 270 to prevent a reenergization of the relay 306. Inasmuch as the relay 306 cannot be reenergized, the sixty minute timer 250 will remain inoperative to thereby prevent further operation of the circuit. The relay 301 may be reset to its standing position by the closing of a reset switch 385 (Fig. 5) connected in parallel with the contactor 261.

The control system is also provided with second, third, fourth and fifth stages, each of which function as does the first stage. The operation of the first stage has been described above.

The second stage is associated with the power supply current and is provided with a counter 390, as indicator lamp 391, and a relay 393 having contactors 394 and 395. The relay 393 is energized when the power supply current rises sufficiently to energize the relay 80.

The third stage is associated with the magnetron tube V2 anode current and is provided with a counter 400, an indicator lamp 401, and a relay 406 having contactors 403 and 404. The relay 406 is energized when the anode current rises above a maximum limit to energize the relay 237.

The fourth stage is associated with the magnetron tube V2 reverse diode current and is provided with a counter 410, an indicator lamp 411, and a relay 412 having contactors 413 and 414. The relay 412 is energized when the reverse diode current rises above a maximum limit to energize the relay 197.

An air pressure switch 420 of a well known type is connected in series with a relay 421 through a circuit including the contactor 286 of the timer 280, one of the contactors 42 of the relay 48 and the contactor 335. If the air pressure applied to the artificial load 19 is sufficient, the switch 420 remains open. If, however, this air pressure drops below a desirable minimum value or limit, the switch 420 closes to energize the relay 421 which closes contactors 422 and 423.

The fifth and last stage is associated with the air pressure supply which maintains the radio frequency plumbing under constant air pressure to prevent arcing in this plumbing, and is provided with a counter 430, an indicator lamp 431, and a relay 432 having contactors 433 and 434. In the event that the air pressure supply should fail, the fifth stage operates in the manner described above in regard to the first stage to indicate a failure.

Each of the second, third, fourth and fifth stages operates exactly as does the first stage.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A system for controlling the operation of a magnetron tube in a predetermined cycle, comprising means for pulsing the magnetron, power supply means connected to the pulsing means, an administrative network for controlling the power supply means to vary the voltage supplied to the pulsing means at predetermined intervals in the cycle, means controlled by the administrative network for supplying a filament voltage to the magnetron, and a monitoring system controlling the administrative network for disconnecting the power supply means from the pulsing means in response to the occurrence of a predetermined number of failures greater than a single failure in the filament voltage supply means or the power supply means within a predetermined time interval.

2. A system for testing a transmitting tube, comprising a pulse forming network connected to and operating the tube, a power supply connected to and operating the pulse forming network, means for controlling the power supply to increase the anode voltage applied to the tube from the pulse forming network at predetermined intervals in a cycle and for then disconnecting the power supply at the end of the cycle, means for applying a filament voltage to the tube, means for controlling the filament voltage applying means to vary said filament voltage at predetermined intervals in the cycle, and means for temporarily rendering the system inoperative in response to an out-of-limits condition in said anode or filament voltage and for stopping the cycle in response to a predetermined number of such out-of-limits conditions in excess of a single out-of-limits condition within a predetermined time interval.

3. A system for testing a transmitting tube, comprising a pulse forming network connected to and controlling the operation of the tube, a power supply connected to and operating the pulse forming network, means for controlling the power supply to vary the anode voltage applied to the tube by the pulse forming network at predetermined intervals and for then disabling the power supply after a predetermined time interval, means for applying a filament voltage to the tube, means for controlling the filament voltage applying means to vary said filament voltage at predetermined intervals, and monitoring means for disabling the system in response to a predetermined number of failures greater than a single failure in the power supply and the filament voltage applying means within a predetermined time interval.

4. A system for testing a transmitting tube, comprising a pulse forming network connected to said tube, a power supply connected to the pulse forming network for charging said network, a discharge circuit for permitting the pulse forming network to discharge and pulse the tube, means for actuating the discharge circuit at a predetermined frequency to control the operation of the tube, control means for varying the output voltage of the power supply at predetermined time intervals in a cycle, and means for disabling the system in response to a predetermined number of failures greater than a single failure in the power supply within a predetermined time interval.

5. A system for controlling the operation of a magnetron tube, comprising a pulse forming network connected to the magnetron tube for applying pulses thereto, means for supplying a voltage to the pulse forming network to charge said network, means for discharging said network to cause a current to flow through the magnetron tube, a voltage control system for varying the voltage supplied to the pulse forming network at predetermined intervals in a cycle, means for supplying a filament voltage to the tube, a filament voltage control system for controlling the filament voltage supplying means to vary the filament voltage at predetermined intervals in the cycle, means for monitoring the filament voltage, means for monitoring the current flowing through the magnetron tube, and means actuated by the filament voltage monitoring means and the magnetron current monitoring means for disconnecting the voltage supplying means from the pulse forming network for a predetermined time interval in the cycle in response to an out-of-limits condition in the magnetron current or the filament voltage and for preventing a reconnection of the voltage supplying means to the pulse forming network in response to a predetermined number of said out-of-limits conditions in excess of a single out-of-limits condition in said time interval.

6. A system for testing a magnetron tube, comprising means for operating the tube, said operating means applying a filament voltage and an anode voltage to said tube, means connected to the tube for monitoring the anode current flowing therethrough, means connected to the tube for monitoring the filament voltage thereof, a first timer connected in the system for controlling the operation thereof in a predetermined cycle, a second timer operated by the first timer for controlling the operating means to vary the anode voltage of the magnetron tube at predetermined intervals in the cycle, a third timer operated by the monitoring means in response to an out-of-limits condition in the anode current or the filament voltage, a stepping relay connected so as to be energized by the third timer at the end of its timing cycle, a relay connected so as to be deenergized by the third timer at the end of its timing cycle and having normally open contacts for disabling the first timer and the operating means when said relay is deenergized, and a fourth timer connected so as to be energized when the stepping relay is energized, said fourth timer having a contactor for resetting the stepping relay when said fourth timer ends its timing cycle, said stepping relay deenergizing the fourth timer in response to a predetermined number of cycles of the third timer during the timing cycle of said fourth timer.

7. A system for testing a magnetron tube, comprising a pulse transformer connected to the tube to be tested, a pulse forming network connected to the pulse transformer, a rectifier connected to the pulse forming network, a power supply connected to the rectifier, means for discharging the pulse forming network to cause an anode current to flow through the tube, a trigger generator for controlling the discharging means, means for applying a filament voltage to the tube under test, a filament resistor connected to the filament voltage applying means, a normally energized relay connected across the filament resistance and having contacts held open when the filament voltage is above a predetermined value, an anode current resistance connected to the tube, a normally deenergized relay connected across the anode current resistance and having normally open contacts, said normally deenergized relay closing said contacts in response to an increase in the anode current above a predetermined value, a first timer having a plurality of contactors for operating the system in a predetermined cycle, a second timer operated by the first timer for controlling the power supply to vary the voltage applied to the rectifier at predetermined intervals in the cycle, a third timer, means operated in response to a closing of the contacts of the normally energized relay or the normally deenergized relay for starting the third timer, a stepping relay operated by the third timer when said timer times out, and a fourth timer operated by the stepping relay for resetting said relay after a predetermined time interval, said stepping relay disconnecting the fourth timer to prevent said resetting in the event that the third timer is energized a predetermined number of times during said predetermined time interval, said third timer also disabling the first timer to stop the testing cycle until said third timer times out.

8. A system for testing a magnetron which comprises power means for operating said magnetron, a timer, means connected to said timer and said magnetron for actuating said timer upon the occurrence of a fault in said magnetron, a stepping switch operated by said timer at the end of its timing cycle, means energized by the operated stepping switch for resetting said timer, said actuating means again actuating said timer which again operates said stepping switch in the event the fault remains or new faults occur in said magnetron, and means associated with said stepping switch for disconnecting said power supply after said stepping switch has been actuated a predetermined multiple number of times.

9. A system for controlling the operation of a magnetron tube during a testing operation which comprises power means for operating said magnetron, a timer, a plurality of fault responsive devices connected to said timer and to various parts of said magnetron for simultaneously actuating said timer upon the occurrence of a fault or faults in said magnetron, a stepping switch actuated by said timer at the end of its timing cycle, means energized by the actuated stepping switch for resetting said timer, said fault responsive devices again actuating said timer which again actuate said stepping switch in the event said fault or faults continue to exist or in the event new faults occur, and means associated with said stepping switch for disconnecting said power supply after said stepping switch has been actuated a predetermined multiple number of times.

References Cited in the file of this patent
UNITED STATES PATENTS

| | | |
|---|---|---|
| 2,815,445 | Young et al. | Dec. 3, 1957 |
| 2,864,058 | Fredrick | Dec. 9, 1958 |
| 2,882,485 | Colvin et al. | Apr. 14, 1959 |

OTHER REFERENCES

Nowogrodzki: "Tele-Tech," October 1952, pp. 36, 37, 110, and 111.